(12) United States Patent  (10) Patent No.: US 12,366,228 B2
Alberts et al.  (45) Date of Patent: Jul. 22, 2025

(54) DAMPING MECHANICAL OSCILLATIONS RELATED TO A WIND TURBINE

(71) Applicant: Siemens Gamesa Renewable Energy A/S, Brande (DK)

(72) Inventors: Johannes Gerhardes Wardjan Alberts, Brøndby Strand (DK); Kenneth Stoltze, Fredericia (DK)

(73) Assignee: SIEMENS GAMESA RENEWABLE ENERGY A/S, Brande (DK)

( * ) Notice: Subject to any disclaimer, the term of this patent is extended or adjusted under 35 U.S.C. 154(b) by 0 days.

(21) Appl. No.: 18/693,246

(22) PCT Filed: Sep. 12, 2022

(86) PCT No.: PCT/EP2022/075219
§ 371 (c)(1),
(2) Date: Mar. 19, 2024

(87) PCT Pub. No.: WO2023/046506
PCT Pub. Date: Mar. 30, 2023

(65) Prior Publication Data
US 2024/0401567 A1 Dec. 5, 2024

(30) Foreign Application Priority Data
Sep. 24, 2021 (EP) .................................. 21198740

(51) Int. Cl.
F03D 7/04 (2006.01)
(52) U.S. Cl.
CPC .................... F03D 7/048 (2013.01)
(58) Field of Classification Search
CPC ...... F03D 7/0298; F03D 7/302; F03D 7/0284; F03D 7/028; F03D 7/0296; F03D 7/048;
(Continued)

(56) References Cited

U.S. PATENT DOCUMENTS 6,525,518 B1 * 2/2003 Garnaes ................. F03D 17/00
73/579
2004/0108729 A1 * 6/2004 Wobben ................. F03D 17/00
290/44
(Continued)

FOREIGN PATENT DOCUMENTS

EP 3207246 A1 8/2017
EP 3256719 A1 12/2017
(Continued)

OTHER PUBLICATIONS

PCT International Search Report and Written Opinion of International Searching Authority mailed Nov. 23, 2022 corresponding to PCT International Application No. PCT/EP2022/075219 filed Sep. 12, 2022.

*Primary Examiner* — Courtney D Heinle
*Assistant Examiner* — Ryan C Clark
(74) *Attorney, Agent, or Firm* — Schmeiser, Olsen & Watts LLP

(57) ABSTRACT

A method of controlling plural wind turbines regarding a mechanical oscillation damping action is provided, the method including: obtaining for at least one, in particular each, wind turbine an oscillation damping power portion, the oscillation damping power portion being determined to dampen at least one mechanical oscillation related to the respective wind turbine; computing a correlation related value of the oscillation damping power portion with a comparison power output related to the wind park; and adapting the oscillation damping power portion for at least one, in particular each, wind turbine based on the correlation related value.

15 Claims, 4 Drawing Sheets

Figure 1:
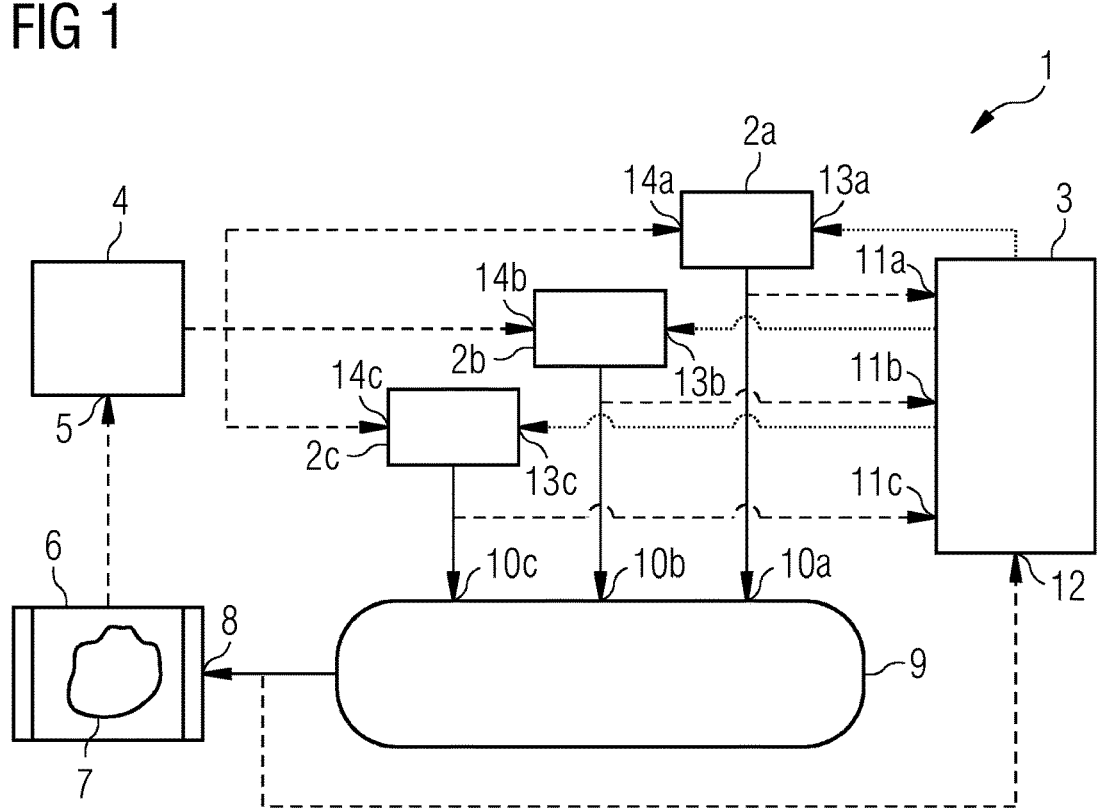

(58) Field of Classification Search
CPC ................ F03D 17/015; F03D 17/017; F05B 2260/964; F05B 2270/334; F05B 2270/335; F05B 2270/337
See application file for complete search history.

(56) References Cited

U.S. PATENT DOCUMENTS

| | | | | |
|---|---|---|---|---|
| 2010/0013235 A1* | 1/2010 | Bjerge | .................. | F03D 7/0296 290/55 |
| 2010/0072751 A1* | 3/2010 | Andersen | .............. | F03D 7/0272 290/44 |
| 2010/0111693 A1* | 5/2010 | Wilson | .................. | F03D 7/0296 416/31 |
| 2011/0057445 A1* | 3/2011 | Acedo | .................. | F03D 7/0284 290/44 |
| 2011/0137474 A1* | 6/2011 | Larsen | .................. | F03D 7/0284 290/44 |
| 2011/0309804 A1* | 12/2011 | Yasugi | .................... | H02J 3/381 322/19 |
| 2013/0140820 A1* | 6/2013 | Tarnowski | .............. | F03D 7/042 290/44 |
| 2013/0200621 A1* | 8/2013 | Andresen | .............. | F03D 7/0284 290/44 |
| 2014/0097619 A1* | 4/2014 | Laborda Rubio | ..... | F03D 7/0296 290/44 |
| 2015/0137519 A1* | 5/2015 | Tarnowski | .............. | F03D 7/048 290/44 |
| 2017/0226988 A1* | 8/2017 | Kjær | ...................... | H02K 7/183 |
| 2018/0017042 A1* | 1/2018 | Baun | .................... | H02K 7/1838 |
| 2018/0128243 A1* | 5/2018 | Deng | .................. | G05B 19/048 |
| 2019/0277256 A1* | 9/2019 | Egedal | .................... | H02P 9/008 |
| 2019/0383265 A1* | 12/2019 | Hovgaard | .............. | F03D 9/007 |
| 2020/0263665 A1* | 8/2020 | Dharmadhikari | ..... | F03D 7/0204 |

FOREIGN PATENT DOCUMENTS

| | | | | |
|---|---|---|---|---|
| EP | 3207246 B1 | * | 5/2018 | ........... F03D 7/0284 |
| EP | 3779183 A1 | * | 2/2021 | ........... F03D 7/0284 |
| WO | 2016058610 A1 | | 4/2016 | |

* cited by examiner

DAMPING MECHANICAL OSCILLATIONS RELATED TO A WIND TURBINE

CROSS-REFERENCE TO RELATED APPLICATIONS

This application claims priority to PCT Application No. PCT/EP2022/075219, having a filing date of Sep. 12, 2022, which claims priority to European Application No. 21198740.9, having a filing date of Sep. 24, 2021, the entire contents all of which are hereby incorporated by reference.

FIELD OF TECHNOLOGY

The following relates to a method and to an arrangement of controlling plural wind turbines regarding a mechanical oscillation damping action and the following further relates to a wind park comprising the arrangement.

BACKGROUND

EP 3 207 246 A1 discloses a method for wind turbine generators for reducing electrical disturbances in the form of power variations which are caused by damping controllers arranged to compensate structural oscillations by inducing shaft torque variations. The electrical disturbances are reduced by limiting a damping controller's controlled action which limitation may be determined on basis of on electrical disturbance information determined from power measured example and a location on the grid.

During operation of a wind turbine, such as an onshore wind turbine or an offshore wind turbine, one or more mechanical oscillation mode(s) may be excited by one or more excitation sources. For example, for an offshore wind turbine, sea waves may excite one or more mechanical oscillations. For an onshore wind turbine for example change in wind conditions, including wind gusts, may excite one or more mechanical oscillations. Furthermore, due to transitions from one operational state to another operational state of the wind turbine, excitations may occur.

Conventionally, one or more mechanical oscillations related to a wind turbine may include tower or oscillations and/or foundation oscillations. In particular a system comprising the tower and the foundation may be excited to oscillate, for example according to a side-side oscillation mode and/or a fore-aft oscillation mode for example. Conventionally, a tower oscillation may have been damped by appropriately controlling the wind turbine for example by injecting torque/power which may result in a reduced amplitude of the tower/foundation oscillation mode and thereby may have lowered the fatigue by roughly 10%.

It has however been observed that conventionally an active power output of a wind park comprising plural wind turbines comprises power oscillations. These power oscillations may be problematic because they may contribute to grid instability or to overload electrical hardware on the substations.

Conventionally, grid operators may have tolerated the power oscillations, since they necessarily resulted from the required damping of the tower oscillations. However, the recent design of wind turbines may include to even apply more active damping control to optimize the foundation and tower design, making them less costly and achieve a better business case.

Thus, there may be a need for a method of controlling at least one, in particular plural wind turbines, regarding a mechanical oscillation damping action and there may be a need for a corresponding arrangement, wherein the mechanical oscillation is effectively damped, while excessive power output oscillations at the wind park output terminal are reduced or even avoided.

SUMMARY

An aspect relates to a method of controlling plural wind turbines (of a wind park) regarding a mechanical oscillation damping action, the method comprising obtaining for at least one, in particular each, wind turbine an oscillation damping power portion (a portion of the total wind turbine power output), the oscillation damping power portion being determined to dampen at least one mechanical oscillation related to the respective wind turbine; computing a correlation related value of the oscillation damping power portion with a comparison power output related to the wind park; and adapting the oscillation damping power portion for at least one, in particular each, wind turbine based on the correlation related value.

In embodiments, the method may be implemented in software and/or hardware and may be performed for example by a wind park controller or a computing unit which may communicatively be connected to the wind turbines or may also be performed within a wind turbine controller. In embodiments, the method may control only one wind turbine, one or more wind turbines or plural wind turbines, in particular all wind turbines of the wind park. When the method is for example performed by a wind turbine controller or wind turbine processing section, the wind turbine controller or processing section may be required to merely receive the comparison power output and may further be adapted to compute the correlation related value of its own oscillation damping power portion with the comparison power output. The wind turbine controller may furthermore include an oscillation damping module or unit which may be adapted to compute the oscillation damping power portion, for example based on measurements related to the mechanical oscillation and/or based on estimations or determinations of the oscillation damping the oscillation. Thus, each wind turbine may determine or compute its own oscillation damping power portion for example based on one or measurement signals and/or one or more operational parameters for example. At least one wind turbine may merely then receive the comparison power output which may for example be provided by a measurement station configured to measure power output for example at an output terminal of the wind park, at an output terminal of the wind park, at an output terminal of a substation or an output terminal relating to a node connected to only a group of wind turbines.

The comparison power output may be or comprise a number of different quantities, as will be described below.

The oscillation damping power portion is determined or computed in order to dampen at least one mechanical oscillation related to the respective wind turbine. The mechanical oscillation may in particular relate to a tower and/or foundation oscillation of the respective wind turbine. Other mechanical oscillations are possible, as will be described below.

In embodiments, the method may be performed in real-time and may be performed continuously over time. Thus, continuously, the correlation related value may be computed from the oscillation damping power portion and the respective comparison power output which may pertain to a substantially same time window. After the time window has elapsed, the oscillation damping power component may be adapted for a next point in time. Later on, a next time window may be considered and the oscillation damping power portion and the comparison power output pertaining to this next time window may be considered for computing the next correlation related value. Based on this next correlation related value the oscillation damping power component may then be adapted for the time window after the next time window or the point in time after the next point in time. In particular, communication delays, which may possibly be present, relating to the oscillation damping power portion and/or the comparison power output may be taken into account, since those delays are expected to affect the correlation related value.

The correlation related value may relate to a correlation or a covariance of the oscillation damping power portion (of the respective wind turbine) and the comparison power output. The correlation related value may in particular be computed by performing a sum of plural multiplication results including multiplications between samples of the oscillation damping power portion and samples of the comparison power output. When the correlation related value is relatively high and positive, it may indicate that the oscillating damping power portion changes in a same sense as the comparison power output. This may mean that the oscillating damping power portion of the wind turbine under consideration positively contributes to a possible fluctuation of the comparison power output. Thus, the considered wind turbine may contribute to increasing the fluctuation of the comparison power output. Other wind turbines which have a lower correlation related value may contribute less to a fluctuation of the comparison power output. Thus, computing the correlation related value may effectively enable to identify those wind turbines which contribute to a potential fluctuation of the comparison power output and may further enable to identify other wind turbines which do not or do contribute less to the fluctuation of the comparison power output.

The oscillating damping power component may be adapted for example involving increasing or decreasing an amplitude of the oscillation damping power component and/or changing a phase of the oscillation damping power component. The oscillation damping power component may be adapted if one or more criteria are satisfied or when a set of rules is satisfied. The rules or criteria may be configurable to adapt then to the particular application. For example, if the oscillation damping power component of the wind turbine under consideration is relatively low, it may not contribute considerably to the comparison power output and therefore, adapting the oscillation damping power component may not be necessary. However, if the oscillation damping power component of the wind turbine under consideration is relatively high and furthermore if the correlation related value is relatively high, the oscillation damping power component of the respective wind turbine may for example be lowered, in order to lower the fluctuation of the comparison power output.

The comparison power output may relate to a sum of power outputs, the sum including at least the oscillation damping power portion of the wind turbine under consideration. Thus, the oscillation damping power portion of the wind turbine under consideration may contribute as a portion to the comparison power output. When the oscillation damping power component for at least one, in particular each wind turbine of the wind park, is adapted based on the correlation related value (and possibly based on other factors as will be explained below), then the fluctuation of oscillation of the comparison power output, in particular a fluctuation at the output terminal of the entire wind park, may be reduced.

According to an embodiment of the present invention, adapting the oscillation damping power portion for each wind turbine is only performed, if the correlation related value is above a non-negative correlation threshold and/or below a non-positive correlation threshold; and/or wherein adapting the oscillation damping power portion for each wind turbine is further based on an amplitude or fluctuation of the comparison power output.

The non-negative correlation threshold may be zero or may be a positive value. The non-positive correlation threshold may be zero or may be a negative value. For example, a change of an amplitude of the oscillation damping power component may be performed to be linear dependent on the correlation related value. In other embodiments, adapting the oscillation damping power component may only be performed, when the correlation related value is outside a dead band, for example defined by the non-negative correlation threshold and the non-positive correlation threshold. Outside this dead band, the amplitude of the oscillation damping power portion may be changed in a linear manner with the correlation related value. Thereby, a simple adaptation scheme may be provided, thereby simplifying the method.

Furthermore, if the amplitude (or deviation from a mean or reference value) of the comparison power output is relatively high, the adaptation of the oscillation damping power portion may involve a bigger change of the amplitude of the oscillation damping power portion compared to the case where the amplitude or deviation from a mean or reference value) of the comparison power output is relatively low.

The amplitude of the comparison power output may in particular relate to a deviation of an actual comparison power output from a nominal or reference comparison power output. For example, when the comparison power output relates to the power output of the entire wind park, the wind park may be required to supply the nominal power output. However, due to the damping actions of the plural wind turbines, the actual comparison power output may include fluctuations around the nominal comparison power output. Thus, the amplitude of the comparison power output may indicate the fluctuation amplitude of the comparison power output or the fluctuation amplitude of the output of the entire wind park. Adapting the oscillation damping power component may further be based on an amplitude and/or a fluctuation of the comparison power output, in particular the wind park power output. If the wind park output power fluctuations are low in standard deviation and/or fluctuations and/or amplitude around the frequency of interest, then there may be no chance of destabilizing the grid and therefore no action has to be taken on individual turbines, in particular the oscillation damping power component of the wind turbines is not needed to be adapted.

According to an embodiment of the present invention, if the correlation related value is positive or above a non-negative correlation threshold, adapting the oscillation damping power portion comprises decreasing (e.g. an amplitude of) the oscillation damping power portion, wherein the decrease in particular being set the higher the higher the correlation related value.

When the oscillation damping power component is decreased in the case that the correlation related value is positive, the contribution of the wind turbine under consideration to a fluctuation of the wind park power output may be reduced, in order to lower the fluctuation of the wind park power output. The higher the correlation related value, the higher the contribution of the respective wind turbine. Thus, by even further decreasing the oscillation damping component, the higher the correlation related value, the contribution to the fluctuation of the wind park power output of the respective wind turbine may be reduced.

According to an embodiment of the present invention, the oscillation damping power portion for each wind turbine is only adapted, if the comparison power output (or a fluctuation thereof or a deviation from a nominal comparison power output), in particular a total power output or a total of the oscillation damping power portions of the wind farm, is above a comparison power threshold.

In the case that the comparison power output or in particular a fluctuation thereof or a deviation from a nominal comparison power output is relatively high, it may indicate undesired fluctuations of the power output, for example at the wind park output terminal or a substation output terminal. In this case, the respective power damping action of the respective wind turbines which contribute to the fluctuation of the comparison power output may be ordered to reduce their respective oscillation damping power component. Thereby, oscillations or fluctuations of the comparison power output may be reduced.

According to an embodiment of the present invention, the oscillation damping power portion for each wind turbine is in particular only adapted, if the damping power component of the respective wind turbine is above a wind turbine damping power threshold.

Thereby, a further influencing factor is specified which, when included, may improve the reduction of fluctuations at the wind park output terminal as well as to improve the damping properties. For example, the damping power component of the respective wind turbine may not be adapted, if the damping power component is below the wind turbine damping power threshold. Thereby, effective damping of the mechanical oscillation is maintained. However, if the damping power component of the respective wind turbine is above the wind turbine damping power threshold and furthermore if the correlation related value is relatively high, reduction of the respective damping power component may be required in order to reduce fluctuations of the comparison power output, in particular fluctuations of the wind park power output.

According to an embodiment of the present invention, if the correlation related value is negative or below a non-positive correlation threshold, adapting the oscillation damping power portion comprises maintaining or increasing (e.g. an amplitude of) the oscillation damping power portion, wherein the increase in particular being set the higher the lower the correlation related value.

If there is a negative correlation related value, it may indicate that the respective wind turbine does not contribute to a fluctuation of the comparison power output, but that the wind turbine counteracts a fluctuation of the comparison power output due to its oscillation damping power component. Thus, for this particular wind turbine its oscillation damping power component may be increased, in order to further counteract the fluctuation present at the wind park output terminal. In other embodiments, the oscillation damping power component is maintained without changing it, since it may be determined to optimally damp the respective mechanical oscillation of the wind turbine under consideration.

According to an embodiment of the present invention, the comparison power output is one of a total power output or a total of the oscillation damping power portions of the wind farm, a deviation of a total power output or a total of the oscillation damping power portions of the wind farm from a respective reference or nominal value, a total power output or a total of the oscillation damping power portions of a substation the wind farm, a deviation of a total power output or a total of the oscillation damping power portions of a substation of the wind farm from a respective reference or nominal value, a total power output or a total of the oscillation damping power portions of a group of wind turbines, an oscillation damping power portion of one or more other wind turbines of the wind park.

In general, the comparison power output may be a fluctuation portion or oscillation portion of a power output of one or more of the wind turbines or one or more of the substations or the entire wind park. Each of these entities may be associated with a respective nominal or reference value. The comparison power output may then be the deviation or difference between the actual power output and the reference or nominal power output (of a group of wind turbines, of a substation or the entire wind park). For example, the comparison power output may relate to a fluctuating portion or oscillating portion of the wind park power output (for example computed as a difference between the actual wind park power output and a reference or nominal wind park power output. In particular, the amplitude of the comparison power output may fluctuate with time (for example different from a nominal wind park power output which may substantially be constant). Thereby, numerous manners how the comparison power output is defined may be provided.

In an embodiment of the invention the fluctuations of the comparison power output may be filtered for a frequency range of interest.

According to an embodiment of the present invention, the mechanical oscillation related to the respective wind turbine comprises one of: a tower oscillation, in particular side-side oscillation and/or fore-aft oscillation; a system oscillation of a system comprising the wind turbine and a sea floor foundation; a system oscillation of a system comprising the wind turbine and a floating platform, wherein the mechanical oscillation has in particular an oscillation period between 1 seconds and 10 seconds, further in particular between 4 seconds and 6 seconds. Thereby, typical mechanical oscillations observed while operating wind turbines may be supported.

According to an embodiment of the present invention, the correlation related value is computed considering power samples of the oscillation damping power portion and power samples of the comparison power output over a time window, a length of the time window being defined to be between one and three times the oscillation period of the mechanical oscillation.

The power samples may be measured or determined for example by a processing section or may be estimated from one or more operational parameter values. For example, the power samples of the oscillation damping power portion may be determined, based for example on oscillation measurement results, in order to reduce the mechanical oscillation, for example by injecting torque and/or active power at the frequency of the observed mechanical oscillation.

When one to three oscillation periods of the mechanical oscillation are considered for the power samples, a covariance or correlation between the oscillation damping power portion and the comparison power output may effectively be detected. Thereby, identification of those wind turbines which contribute to the fluctuation or deviation of the wind park power output from a nominal value may be improved.

According to an embodiment of the present invention, the correlation related value is computed involving at least one of band pass filtering the power samples, band pass filtering including to attenuate frequency components outside a frequency range of a considered mechanical oscillation; normalizing the, in particular band pass filtered, power samples; pairwise multiplying the, in particular filtered and normalized, power samples of the oscillation damping power portion in the time window with the, in particular filtered and normalized, power samples of the comparison power in the time window, to obtain plural multiplication results; summing the multiplication results.

The band pass filtering may be based on the mechanical oscillation under consideration. The normalization may simplify the interpretation of the result of the correlation related value. The normalization may include to subtract a mean and divide the difference between the actual sample value and the mean by for example a standard deviation or empirical or application dependent quantity. Thereby, the correlation related may be computed in a simple manner.

According to an embodiment of the present invention, the correlation related value is the empirical correlation coefficient between the oscillation damping power portion and the comparison power output taken over a time window. Thereby, conventionally available algorithms may be utilized. The empirical correlation coefficient may for example be or comprise the Pearson correlation coefficient.

According to an embodiment of the present invention, the oscillation damping power portion and the comparison power output comprises or represents active power; and/or wherein the comparison power output in particular being a total power output of the wind farm is measured at the wind park output terminal; and/or wherein oscillation damping power portion of each wind turbine is obtained from a wind turbine control module; and/or wherein the power samples of the oscillation damping power portions for the plural wind turbines and the comparison power output are obtained at a computing module; wherein each of the wind turbines obtains the comparison power output and is configured to calculate the correlation related value and to adapt its oscillation damping power portions based on the correlation related value.

Conventionally, a wind turbine may damp a mechanical oscillation by changing the active power reference thereby introducing an oscillating torque and/or oscillating active power output which dampens the mechanical oscillation. Thereby, different manners how to perform the method may be provided thereby increasing flexibility.

According to an embodiment of the present invention, the plural the wind turbines comprise offshore wind turbines and/or onshore wind turbines.

Thus, any wind turbine may be supported, wherein different excitation sources may be present for the different kinds of wind turbines. For example, for offshore wind turbines sea waves may excite mechanical oscillations, while onshore wind turbines may be excited by wind gusts. All types of wind turbines may further be excited regarding a mechanical oscillation due to a transition from one operational regime to another operational regime, for example including curtailing or releasing curtailment.

It should be understood that features, individually or in any combination, disclosed, described, explained or provided for a method of controlling plural wind turbines regarding a mechanical oscillation damping action may also, individually or in any combination, be applied to an arrangement for controlling plural wind turbines regarding a mechanical oscillation damping action, according to embodiments of the present invention and vice versa.

According to an embodiment of the present invention, it is provided an arrangement for controlling plural wind turbines (of a wind park) regarding a mechanical oscillation damping action, the arrangement comprising: an input module adapted to obtain for at least one, in particular each, wind turbine an oscillation damping power portion (a portion of the total wind turbine power output), the oscillation damping power portion being determined to dampen at least one mechanical oscillation related to the respective wind turbine; a computing module adapted: to compute a correlation related value of the oscillation damping power portion with a comparison power output related to the wind park; and to adapt the oscillation damping power portion for each wind turbine based on the correlation related value.

The arrangement may be implemented as a centralized unit or may include several subunits for example distributed across the wind park, for example also comprised partly in wind turbine controllers and/or a wind park controller.

According to an embodiment of the present invention, it is provided a wind park comprising plural wind turbines and an arrangement according to the preceding embodiment which is communicatively connectable or connected to the wind turbines.

BRIEF DESCRIPTION

Figure 2:
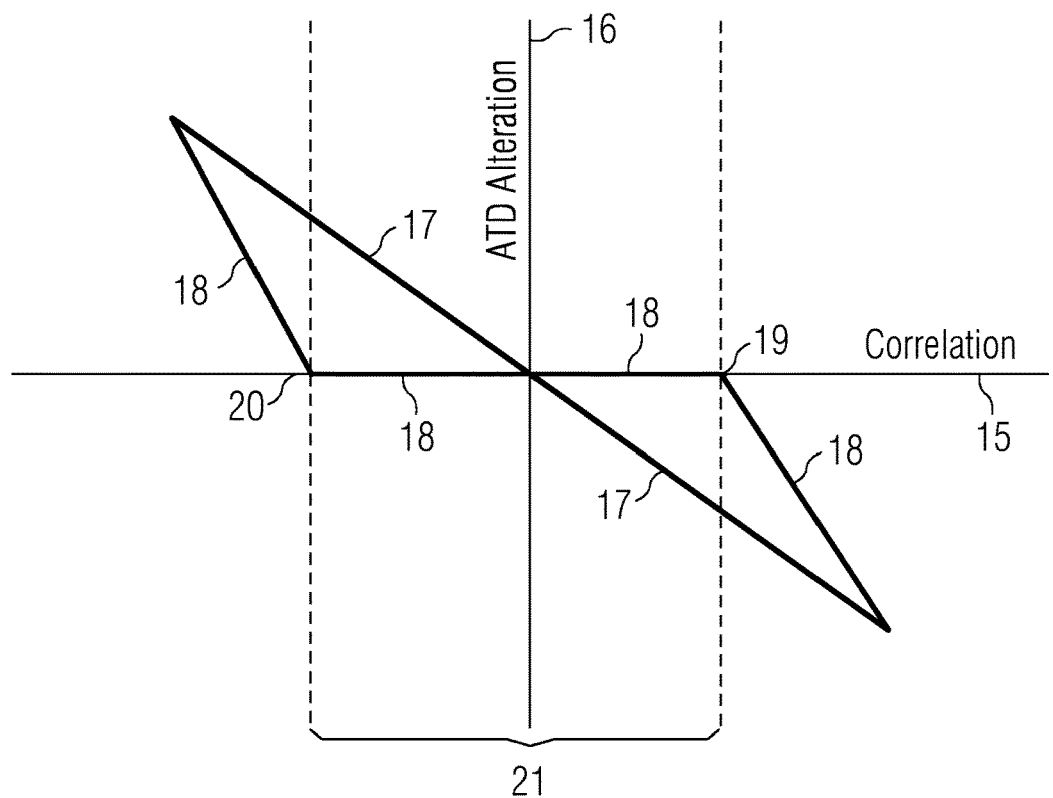
Figure 3:
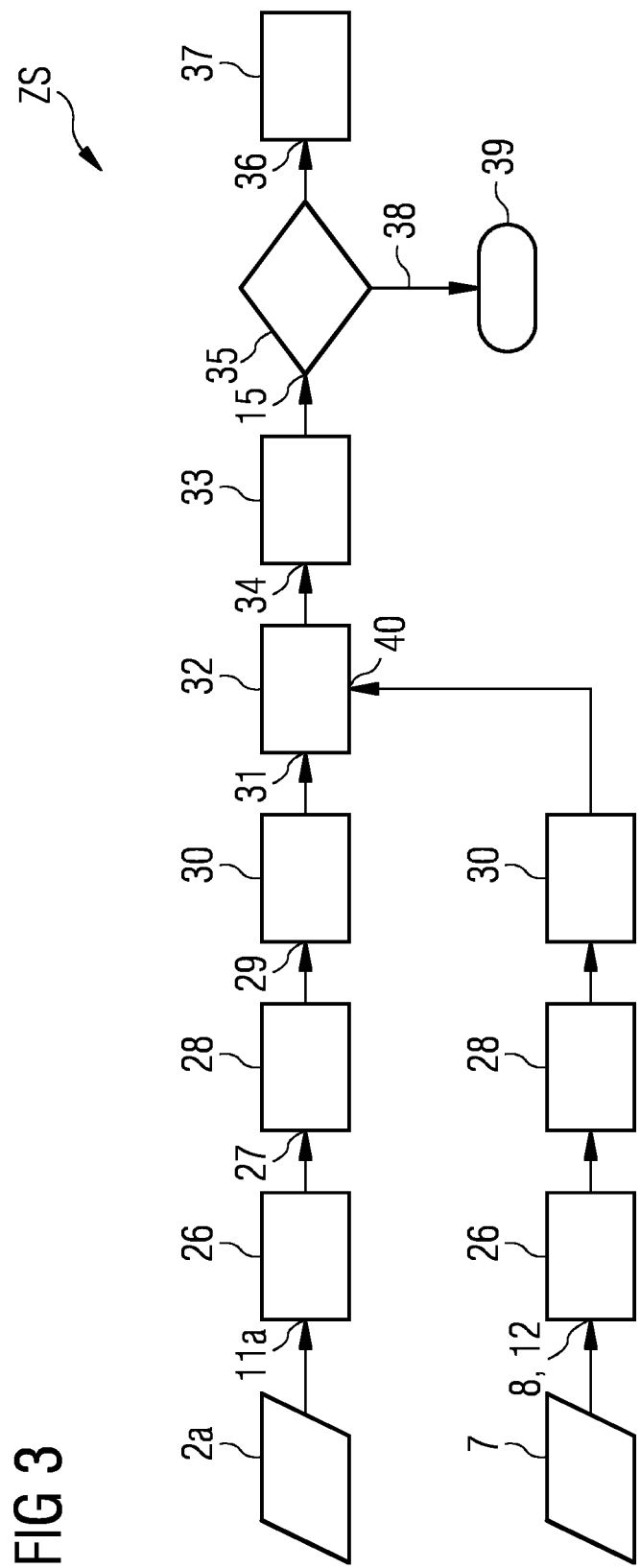
Figure 4:
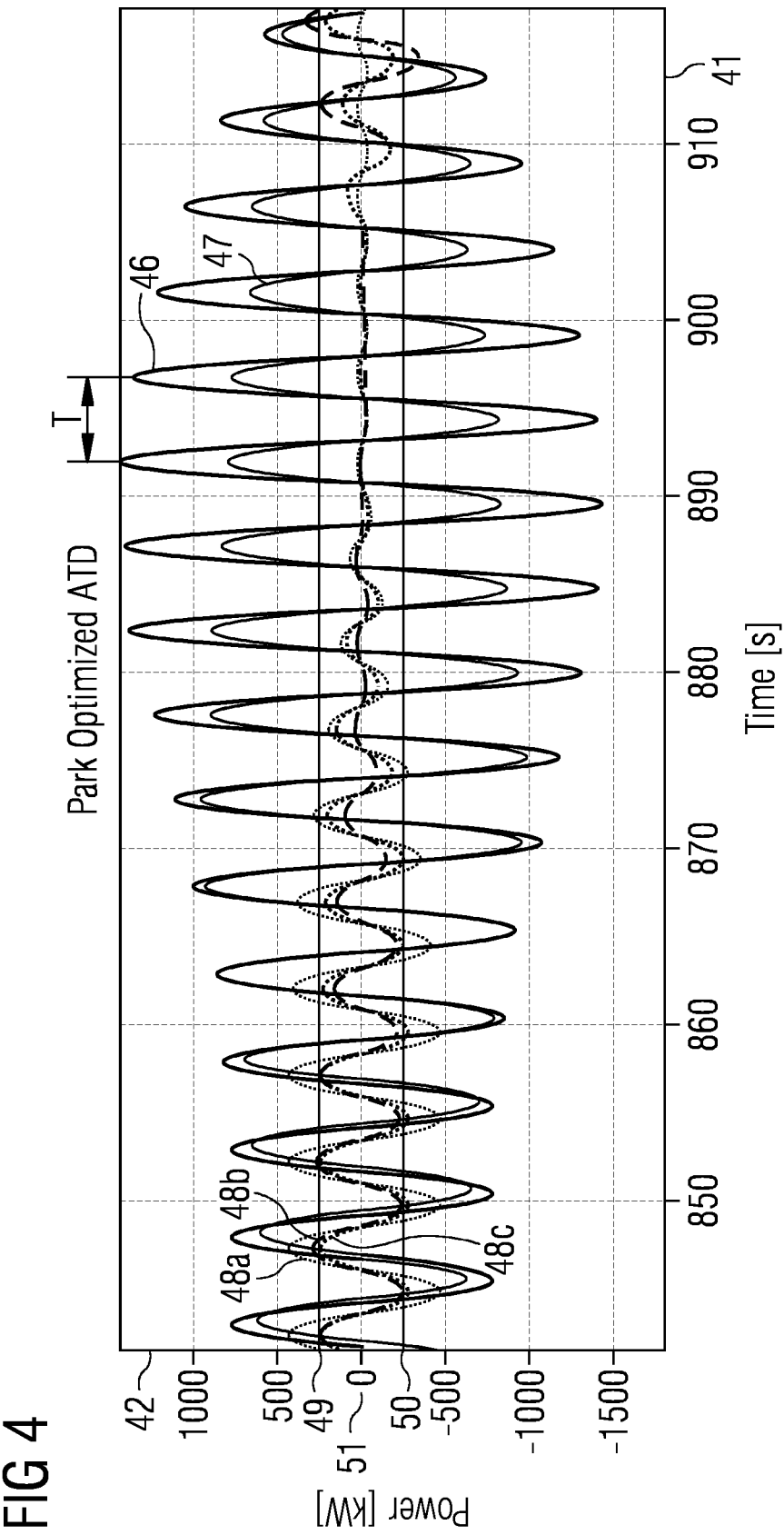
Figure 5:
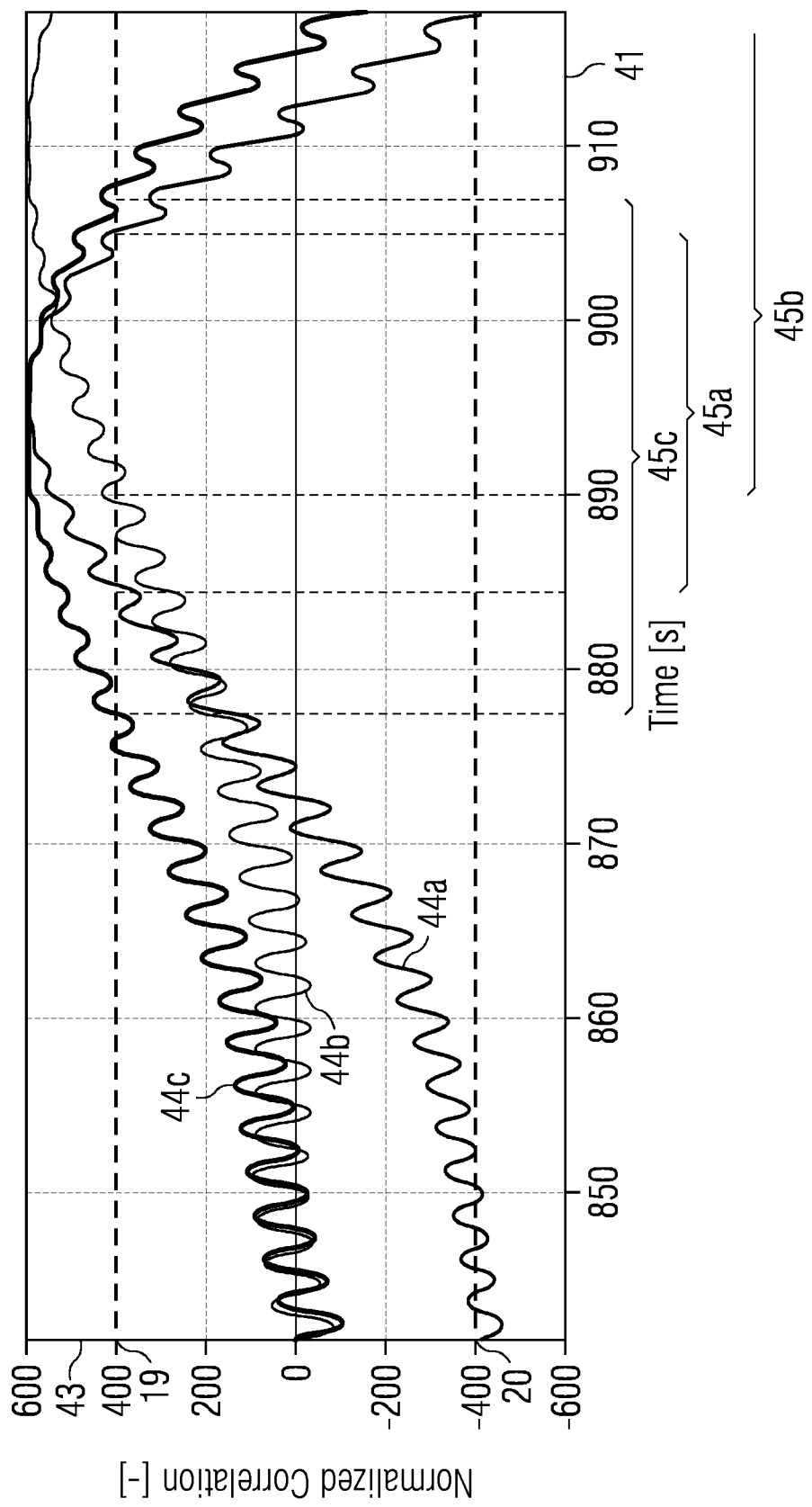

Some of the embodiments will be described in detail, with references to the following Figures, wherein like designations denote like members, wherein:

FIG. 1 schematically illustrates a wind park according to an embodiment of the present invention;

FIG. 2 illustrates a graph for illustrating a method of controlling plural wind turbines according to an embodiment of the present invention;

FIG. 3 schematically illustrates method steps of a method for controlling plural wind turbines according to an embodiment of the present invention; and FIG. 4 illustrates simulation results applying methods according to embodiments of the present invention; and FIG. 5 illustrates simulation results applying methods according to embodiments of the present invention.

DETAILED DESCRIPTION

The wind park 1 schematically illustrated in FIG. 1 comprises plural wind turbines 2a, 2b, 2c and further comprise an arrangement 3 for controlling plural wind turbines according to an embodiment of the present invention. The arrangement 3 is configured to perform or control a method for controlling plural wind turbines.

The wind park 1 comprises a wind park controller 4 which receives a power reference 5 for the entire wind park 1 from a grid operator 6. The grid operator 6 operates the utility grid 7 to which the wind park power 8 is supplied from a substation 9. Thereby the substation 9 is connected to receive the wind turbine output power 10a, 10b, 10c from the individual wind turbines 2a, 2b, 2c. The wind park 1 may comprise more than three wind turbines, for example 10 to 200 wind turbines. The wind park 1 may further comprise more than one substation 9 such that for example 10 to 30 substations which are respectively connected to respective groups of wind turbines.

In FIG. 1 the solid lines are power transmission lines, the dashed lines are information lines or control signal lines, and the dotted lines are the information channel lines communicating the active tower damping configuration to the wind turbines.

The arrangement 3 is also referred to as a synchronization analyser within the context of the present application. The arrangement 3 is configured to carry out or control a method of controlling the plural wind turbines 2a, 2b, 2c according to an embodiment of the present invention regarding a respective mechanical oscillation damping action performed within or at the wind turbines 2a, 2b, 2c. Thereby the arrangement 3 receives or obtains an oscillation damping power portion 11a, 11b, 11c from the wind turbines 2a, 2b, 2c, respectively. The oscillation damping power portions 11a, 11b, 11c are determined by the individual wind turbines 2a, 2b, 2c in order to dampen at least one mechanical oscillation related to the respective wind turbine. The oscillation damping power portions 11a, 11b, 11c may represent active power portions, i.e. a respective portion of the respective total wind turbine output power 11a, 11b, 11c which are received by the substation 9.

The arrangement 3 further receives a signal 12 representing the total wind park output power 8. The total wind park output power 8 or the respective signal 12 regarding the total wind park output power are examples of a comparison power output according to embodiments of the present invention.

The arrangement 3 computes a correlation related value of the oscillation damping power portion 11a,b,c, with the comparison power output 8, 12 related to the wind park based on the respective wind turbine specific correlation related value. The arrangement 3 is further configured to determine adapted oscillation damping power components 13a, 13b, 13c for the respective wind turbine 2a, 2b, 2c. Those adapted oscillation damping power components or portions 13a, 13b, 13c are communicated by the arrangement 3 to the respective wind turbines 2a, 2b, 2c which are therefore communicatively connected to the arrangement 3.

According to embodiments of the present invention, the arrangement 3 may for example be implemented within the wind park controller 4 or may partly be implemented in the wind turbines 2a, 2b, 2c, and/or the substation 9 and/or the wind park controller 4 or may be implemented in a separate entity.

The wind turbines 2a, 2b, 2c are then operated according to the adapted respective oscillation damping power portions 13a, 13b, 13c and accordingly output the wind turbine total output power 10a, 10b, 10c, respectively. Thus, a contribution of the total wind turbine output power 10a, 10b, 10c are the respective oscillation damping power portions as specified in the signals 13a, 13b, 13c. Furthermore, a contribution of the total wind park output power 8 is the respective oscillation damping power portions as specified in the signals 13a, 13b, 13c.

The wind park controller 4 provides respective wind turbine power references 14a, 14b, 14c to the wind turbines 2a, 2b, 2c, respectively. The total wind turbine output power 10a, 10b, 10c may for example be the sum of the wind turbine power references 14a, 14b, 14c and the respective oscillation damping power portions 13a, 13b, 13c. However, due to particular control of other components of the wind turbine, the total wind turbine power output 10a, 10b, 10c may comprise further control power portions according to embodiments of the present invention.

In FIG. 1, the park controller 4 receives the power references from the grid operator 6 and then divides the power reference 5 for the entire wind park into individual power references 14a, 14b, 14c for the individual wind turbines 2a, 2b, 2c. The wind turbines 2a, 2b, 2c supply active power or in general wind turbine output power 10a, 10b, 10c to the substation 9 which supplies the total wind park power output 8 to the utility grid 7. The synchronization analyser 3 receives or reads each turbine's active tower damping (ATD contribution (labelled with reference signs 11a, 11b, 11c in FIG. 1) and may compare it to the power 8 which is supplied to the utility grid 7. The synchronization analyser 3 thus may compute which of the wind turbines should change or adapt its oscillation damping power portion (also referred to as active tower damping (ATD)).

FIG. 2 illustrates in a graph having an abscissa 15 indicating the correlation value and having an ordinate 16 indicating the change or alteration of the oscillation damping power portion (or ATD) according to curves 17 and 18 for illustrating different embodiments for changing or altering the oscillation damping power portion. As mentioned above, the arrangement computes a correlation related value of the respective oscillation damping power portion 11a, 11b, 11c and the comparison power output 8 and by signal 12.

According to the curve 17, when the correlation related value is positive, the amplitude of the oscillation damping power portion is decreased (the negative branch of the curve 17 in FIG. 2). If the correlation is negative, the amplitude of the oscillation damping power portion is increased (the left-hand side portion of the curve 17 in FIG. 2).

According to another embodiment a non-negative correlation threshold 19 and/or a non-positive correlation threshold 20 are defined for defining the curve 18 comprising linear sections. If the correlation related value 15 is within the dead band 21 (i.e. below the non-negative correlation threshold 19 and above the non-positive correlation threshold 20), then the oscillation damping power component 11a, 11b, 11c is not altered or changed. However, the oscillation damping power component 11a, 11b, 11c is altered, if the correlation 15 is above the non-negative threshold 19, in the sense that the amplitude of the correlation damping power component is reduced. If the correlation value 15 is lower than the non-positive correlation threshold 20, the oscillation damping power component is increased (the left-hand side section 18 in FIG. 2 indicated in an inclined line). The inclination of the inclined lines 18 may be adapted according to the application. Also, the thresholds 19, 20 may be configured or defined according to the particular application. The curves 17, 18 may or may not be straight lines, they may also be curved lines for example.

At the wind park controller 4, the total contribution of each wind turbines active power damping component may be monitored. If the total contribution is above a certain threshold, the park controller may lower or increase the individual contribution 11a, 11b, 11c of each turbine 2a, 2b, 2c by selecting those turbines which are in phase with the park level damping components. This may also be done at all times, instead of above a certain threshold, as is exemplified in FIG. 2 by the curves 17, 18. Thereby, in FIG. 2, the X-axis is the correlation, with a positive correlation on the right side of the diagram and a negative correlation on the left side. On the Y-axis is indicated the ATD alteration with increased ATD contribution for a negative correlation, meaning it will damp out the oscillation and a lowered ATD contribution for a positive correlation. This may be a linear relationship as indicated in FIG. 3 curve 17 or a piece-wise linear relationship as indicated by the curve 18. It may however be any other predefined relationship.

FIG. 3 schematically illustrates a method 25 which may be performed for example by the arrangement 3, in order to calculate a correlation related value 15. Wind turbine 2a supplies the oscillation damping power portion 11a to a filtering unit 26 which is configured as a band pass filter. The oscillation damping power portion 11a is supplied as multiple sample values across a particular time window. The filtering unit 26 applies a band pass filtering, in order to supply filtered sample values 27 to a normalization module 28. The normalization module 28 may for example subtract a mean and divide the difference by a standard deviation in order to output normalized sample values 29 to a sliding data buffering module 30. The sliding data buffering module may extract data samples corresponding to a particular selectable time window and supply the sample values within the time window 31 to a multiplication element 32.

Same or similar steps of filtering 26, normalization 28, sliding data buffering 30 are applied to the total wind park output power 8, 12 which is received by the utility grid 7, to generate samples 40 to unit 32. Thus, at the multiplication element 32, the filtered, normalized oscillation damping power portion 2a is multiplied in a pairwise manner with the filtered, normalized total wind turbine output power 8, 12 across the selected time window.

In a summation element 33 the plural multiplication results 34 are summed, in order to derive the correlation related value 15. In a decision block 35 it is assessed whether the correlation related value 15 for example is above or below one or more thresholds to decide whether the oscillation damping power portion 11a, 11b, 11c should be altered or not. If the oscillation damping power portion should be altered, it is branched to a path 36 leading to the modification module 37 which modifies or adapts the respective oscillation damping power portion 11a in order to result to the adapted damping power portion 13a, 13b, 13c, respectively. If the decision element 37 assesses a negative result, it is branched to the line 38, where the oscillation damping power portion 11a, 11b, 11c is maintained unchanged at end module 39.

Thus, in FIG. 3 the active power from the wind turbine 2a is compared to the active power sent to the grid by the substation 9. These signals are compared to each other, so they are filtered for the relevant frequency band, then (optionally normalized to scale the correlation) and then the data are fed into a sliding data buffer 30 that compares only a selective past time horizon. The two signals, i.e. 31, 40, are pair-wise multiplied and are summed/integrated to achieve the total correlation value 15 for this time interval or time window. If the correlation is high, then the ATD is altered (lowered). If the correlation is low (a large negative correlation), then the ATD is also altered (increased) or alternatively maintained unchanged. By increasing and lowering the ATD contributions, the resulting oscillations may disappear from the power 8 sent to the grid 7 and the correlation may slowly decrease, removing the ATD alteration. The ATD contribution is 90° out of phase then the correlation may be 0 and the ATD may not be altered.

FIGS. 4 and 5 illustrate simulation results when applying embodiments of the present invention. FIGS. 4 and 5 show the impact if three turbines out of a park of 20 have their oscillation damping power adjusted according to an embodiment of the present invention. Therein an abscissa 41 indicates the time. An ordinate in FIG. 4 indicates the power (in particular active power) of the entire wind park, the ordinate 42 in FIG. 5 the ordinate 43 indicates a normalized correlation value. Herein, in FIG. 5 the curves 44a, 44b, 44c indicate the correlation related values as computed for the wind turbine 2a, 2b, 2c illustrated in FIG. 1. FIG. 5 also indicates the non-positive correlation threshold 20 and the non-negative correlation threshold 19 which are also indicated in FIG. 2.

The normalized correlation value 44c of wind turbine 2c is for example within a time interval 45c above the non-negative threshold 19. Within this time interval 45c therefore for example the oscillation damping power portion 11c may be altered to result in the altered oscillation damping power portion 13c.

In contrast, the correlation value 44b of the wind turbine 2b is above the correlation threshold 19 within another time interval 45b in which the respective oscillation damping power portion may be altered. The wind turbine 2a has a respective correlation value 44a which is above the correlation threshold within still another time interval 45a, in which therefore its oscillation damping power portion 11a may be altered to result in the altered oscillation damping power portion 13a.

In FIG. 4 the curve 46 indicates the total power output of the wind park in the conventional situation. It is observed that the wind park power output 46 fluctuates around a nominal value 51. The fluctuation having a repetition period T may result from active tower damping actions performed by the wind turbines 2a, 2b, 2c, wherein the oscillation period T corresponds to an oscillation period of for example a tower oscillation.

The curve 47 illustrates the total wind park output power according to embodiments of the present invention. It can be appreciated from FIG. 4 that the resulting total power output 47 of the wind park comprises much lower fluctuations compared to the conventional wind park power output 46.

The curves 48a, 48b, 48c represent the oscillation damping power portions 11a, 11b, 11c as determined by the wind turbine 2a, 2b, 2c. FIG. 4 comprises further wind turbine damping power threshold 49 and another wind turbine damping power threshold 50. The respective oscillation damping power portions 48a, 48b, 48c are compared to the wind turbine damping power thresholds 49, 50 in order to decide whether to adapt the oscillation damping power portion or not. For example, the oscillation damping power portions are only adapted if the respective damping power portion is above the positive threshold 49. For example, if the oscillation damping power portion is within the range between the thresholds 49 and 50, the respective oscillation damping power portions may not be adapted but may be maintained unchanged.

According to an embodiment of the present invention, the power outputs of individual wind turbines are compared to each other and correlated with other. Each wind turbine may communicate a phase and an amplitude of the tower frequency by means for example of a phase locked loop. This information may be sent to the park controller or a computer that has access to all wind turbines, which then computes which turbine should have their oscillation damping power contribution lowered or increased to get the lowest mean level of oscillations.

Although the present invention has been disclosed in the form of embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A method of controlling a plurality of wind turbines regarding a mechanical oscillation damping action, the method comprising:
    obtaining for at least one wind turbine an oscillation damping power portion, the oscillation damping power portion being determined to dampen at least one mechanical oscillation related to the at least one wind turbine;
    computing a correlation related value of the oscillation damping power portion with a comparison power output related to a wind park; and
    adapting the oscillation damping power portion for the at least one wind turbine based on the correlation related value;
    wherein the correlation related value is the empirical correlation coefficient between the oscillation damping power portion and the comparison power output taken over a time window.

2. The method according to claim 1,
    wherein the adapting the oscillation damping power portion for the at least one wind turbine is only performed, if the correlation related value is above a non-negative correlation threshold and/or below a non-positive correlation threshold; and/or
    wherein the adapting the oscillation damping power portion for the at least one wind turbine is further based on an amplitude or a fluctuation of the comparison power output.

3. The method according to claim 1, wherein if the correlation related value is positive or above a non-negative correlation threshold, the adapting the oscillation damping power portion comprises:
    decreasing the oscillation damping power portion, wherein a decrease being set higher, the higher the correlation related value.

4. The method according to claim 3, wherein the oscillation damping power portion for the at least one wind turbine is only adapted, if the comparison power output, which is a total power output or a total of the oscillation damping power portions of the wind farm, is above a comparison power threshold.

5. The method according to claim 1, wherein the oscillation damping power portion for the at least one wind turbine is only adapted, if the damping power component of the respective wind turbine is above a wind turbine damping power threshold or below another wind turbine damping power threshold.

6. The method according to claim 1, wherein if the correlation related value is negative or below a non-positive correlation threshold, the adapting the oscillation damping power portion comprises:
    maintaining or increasing the oscillation damping power portion, wherein an increase being set higher, the lower the correlation related value.

7. The method according to claim 1,
    wherein the comparison power output is one of:
        a total power output or a total of the oscillation damping power portions of the wind farm,
        a deviation of a total power output or a total of the oscillation damping power portions of the wind farm from a respective reference or nominal value;
        a total power output or a total of the oscillation damping power portions of a substation the wind farm;
        a deviation of a total power output or a total of the oscillation damping power portions of a substation of the wind farm from a respective reference or nominal value;
        a total power output or a total of the oscillation damping power portions of a group of wind turbines; and
        an oscillation damping power portion of one or more other wind turbines of the wind park.

8. The method according to claim 1,
    wherein the mechanical oscillation related to the respective wind turbine comprises one of:
        a tower oscillation, side-side oscillation and/or fore-aft oscillation;
        a system oscillation of a system comprising the wind turbine and a sea floor foundation;
        a system oscillation of a system comprising the wind turbine and a floating platform; and
    wherein the mechanical oscillation has an oscillation period between 1 seconds and 10 seconds.

9. The method according to claim 1,
    wherein the correlation related value is computed considering power samples of the oscillation damping power portion and power samples of the comparison power output over a time window, a length of the time window being defined to be between one and three times the oscillation period of the mechanical oscillation.

10. The method according to claim 9,
    wherein the correlation related value is computed involving at least one of:
        band pass filtering the power samples, the band pass filtering including to attenuate frequency components outside a frequency range of a considered mechanical oscillation;
        normalizing the band pass filtered power samples;
        pairwise multiplying the filtered and normalized, power samples of the oscillation damping power portion in the time window with the filtered and normalized, power samples of the comparison power in the time window, to obtain a plurality of multiplication results; and
        summing the plurality of multiplication results.

11. The method according to claim 1,
    wherein the oscillation damping power portion and the comparison power output comprises or represents active power; and/or
    wherein the comparison power output being a total power output of the wind farm is measured at the wind park output terminal; and/or
    wherein the oscillation damping power portion of each wind turbine is obtained from a wind turbine control module; and/or
    wherein the power samples of the oscillation damping power portions for the plural wind turbines and the comparison power output are obtained at a computing module;
    wherein each of the wind turbines of the plurality of wind turbines obtains the comparison power output and is configured to calculate the correlation related value and to adapt oscillation damping power portions based on the correlation related value.

12. The method according to claim 1, wherein the plurality of the wind turbines comprise offshore wind turbines and/or onshore wind turbines.

13. An arrangement for controlling plural wind turbines regarding a mechanical oscillation damping action, the arrangement comprising:

an input module configured to obtain for at least one wind turbine an oscillation damping power portion, the oscillation damping power portion being determined to dampen at least one mechanical oscillation related to the at least one wind turbine;

a computing module configured:
  to compute a correlation related value of the oscillation damping power portion with a comparison power output related to a wind park; and
  to adapt the oscillation damping power portion for the at least one wind turbine based on the correlation related value;

wherein the correlation related value is the empirical correlation coefficient between the oscillation damping power portion and the comparison power output taken over a time window.

14. A wind park, comprising:
a plurality of wind turbines; and
an arrangement according to claim 13 communicatively connectable to the plurality of wind turbines.

15. A method of controlling a plurality of wind turbines regarding a mechanical oscillation damping action, the method comprising:
  obtaining for at least one wind turbine an oscillation damping power portion, the oscillation damping power portion being determined to dampen at least one mechanical oscillation related to the at least one wind turbine;
  computing a correlation related value of the oscillation damping power portion with a comparison power output related to a wind park; and
  adapting the oscillation damping power portion for the at least one wind turbine based on the correlation related value;
  wherein if the correlation related value is negative or below a non-positive correlation threshold, the adapting the oscillation damping power portion comprises:
  maintaining or increasing the oscillation damping power portion, wherein an increase being set higher, the lower the correlation related value.

* * * * *